United States Patent
Lagerman

(10) Patent No.: US 11,328,525 B2
(45) Date of Patent: May 10, 2022

(54) METHOD FOR CALCULATING DEVIATION RELATIONS OF A POPULATION

(71) Applicant: BeeScanning Global AB, Lindesberg (SE)

(72) Inventor: Björn Lagerman, Lindesberg (SE)

(73) Assignee: BeeScanning Global AB, Lindesberg (SE)

(*) Notice: Subject to any disclaimer, the term of this patent is extended or adjusted under 35 U.S.C. 154(b) by 0 days.

(21) Appl. No.: 17/002,873

(22) Filed: Aug. 26, 2020

(65) Prior Publication Data

US 2021/0073528 A1 Mar. 11, 2021

(30) Foreign Application Priority Data

Sep. 5, 2019 (SE) .................................... 1930281-9

(51) Int. Cl.
*G06K 9/00* (2022.01)
*G06V 40/10* (2022.01)

(52) U.S. Cl.
CPC .................................... *G06V 40/10* (2022.01)

(58) Field of Classification Search
CPC ..... G06T 7/0012; G06T 7/0004; A01K 47/06; A01K 51/00; A01K 53/00; A01K 59/00; G06K 9/00362

See application file for complete search history.

(56) References Cited

U.S. PATENT DOCUMENTS

| 2002/0143483 | A1* | 10/2002 | Ono | H01L 21/67288 |
| | | | | 702/83 |
| 2004/0241677 | A1 | 12/2004 | Lin et al. | |
| 2015/0049919 | A1* | 2/2015 | Humal | G06T 7/0012 |
| | | | | 382/110 |
| 2015/0123801 | A1 | 5/2015 | De Leon et al. | |
| 2017/0066459 | A1* | 3/2017 | Singh | B61L 23/045 |
| 2018/0092336 | A1* | 4/2018 | Erickson | A01K 49/00 |
| 2018/0211380 | A1* | 7/2018 | Tandon | G06K 9/6271 |
| 2019/0066304 | A1* | 2/2019 | Hirano | G06K 9/627 |
| 2019/0121877 | A1* | 4/2019 | Vyas | G06N 3/084 |

(Continued)

FOREIGN PATENT DOCUMENTS

CN 107644200 A 1/2018
CN 110120040 A 8/2019

(Continued)

OTHER PUBLICATIONS

Bjerge et al., "A computer vision system to monitor the infestation level of Varroa destructor in a honeybee colony", Available online Jul. 18, 2019. (Year: 2019).*

(Continued)

*Primary Examiner* — Dung Hong
(74) *Attorney, Agent, or Firm* — WRB-IP LLP

(57) ABSTRACT

A method of calculating the deviation relation of a population registered on an image includes: i.) identifying the objects in the image, ii.) counting the number of identified objects, iii.) identifying abnormalities in the image, iv.) identifying objects with abnormalities in the image, v.) counting the number of objects with abnormalities, vi.) calculating the relation of objects with abnormalities to all objects. A computer program, a handheld computer device, and a system are also provided.

6 Claims, 3 Drawing Sheets

(56) References Cited

U.S. PATENT DOCUMENTS

2019/0354815 A1* 11/2019 Yun .................. G06N 3/082

FOREIGN PATENT DOCUMENTS

| EP | 3132880 A1 | 2/2017 |
|---|---|---|
| GB | 2480498 A | 11/2011 |

OTHER PUBLICATIONS

Bjerge et al: "A computer vision system to monitor the infestation level of Varroa destructor in a honeybee colony" Computers and Electronics in Agriculture, Jul. 18, 2019, vol. 164 Article No. 104898; whole document.

Swedish Official Action (dated Mar. 31, 2020) in corresponding Swedish App. 1930281-9.

K. Simonyan and A. Zisseman. Very deep convolutional networks for large-scale image recognition. arXiv preprint arXiv:1409.1556, 2014.

L.-C. Chen, G. Papandreou, I. Kokkinos, K. Murphy, and A. L. Yuille, Semantic image segmentation with deep convolutional nets and fully connected crfs. arXiv preprint arXiv:1412.7062, 2014.

Girshick, Ross. "Fast r-cnn." Proceedings of the IEEE international conference on computer vision. 2015.

Ren, Shaoqing, et al. "Faster r-cnn: Towards real-time object detection with region proposal networks." Advances in neural information processing systems. 2015.

Redmon, Joseph, et al. "You only look once: Unified, real-time object detection." Proceedings of the IEEE conference on computer vision and pattern recognition. 2016.

Liu, Wei, et al. "Ssd: Single shot muitibox detector," European conference on computer vision. Springer, Cham, 2016.

Dai, Jifeng, et al., "R-fcn: Object detection via region-based fully convolutional networks." Advances in neural information processing systems. 2016.

Boominathan, Lokesh, Srinivas SS Kruthiventi, and R. Venkatesh Babu, "Crowdnet: A deep convolutional network for dense crowd counting." Proceedings of the 24th ACM international conference on Multimedia. ACM, 2016.

He, Kaiming, et al. "Mask r-cnn." Proceedings of the IEEE international conference on computer vision, 2017.

Kang, Di, Zheng Ma, and Antoni B, Chan. "Beyond Counting: Comparisons of Density Maps for Crowd Analysis Tasks—Counting, Detection, and Tracking." IEEE Transactions on Circuits and Systems for Video Technology 29.5 (2018): 1408-1422.

Cai, Zhaowei, and Nuno Vasconcelos. "Cascade r-cnn: Delving into high quality object detection." Proceedings of the IEEE conference on computer vision and pattern recognition. 2018.

Xu, Chenfeng, et al. "Learn to Scale: Generating Multipolar Normalized Density Map for Crowd Counting." arXiv preprint arXiv:1907.12428 (2019).

Zou, YCheng, Qua, Ji, Guo, Zhou,, Attend To Count: Crowd Counting with Adaptive Capacity Multi-scale CNNs, Preprint submitted to Journal of Latex Templates (Aug. 27, 2019).

Sindagi, Vishwanath A., and Vishal M. Patel. "A survey of recent advances in cnn-based single image crowd counting and density estimation." Pattern Recognition Letters 107 (2018): 3-16.

Liu, Weizhe, Mathieu Salzmann, and Pascal Fua. "Context-Aware Crowd Counting." Proceedings of the IEEE Conference on Computer Vision and Pattern Recognition. 2019.

* cited by examiner

METHOD FOR CALCULATING DEVIATION RELATIONS OF A POPULATION

BACKGROUND AND SUMMARY

The invention relates to a method of calculating the deviation relation of a population registered on an image. The invention also relates to a computer program. The invention further relates to a handheld computer device. The invention further relates to a system.

Determining abnormalities of objects among a plenitude of objects is useful in agricultural, food supply and industrial processes. One specific application is to determine infestation of pests in a population such as infestation of varroa in a beehive and/or bee society.

Pest detection, management, and control is a multi-billion dollar industry. Generally, property owners want to use the most economical means to minimize the number of pests on the property. To this end, conventional pest detection systems typically involve two separate steps: detection and treatment. Conventional detection usually involves an individual physically inspecting the premises for pests. In order to determine if pests are present, the person doing the inspection must regularly and thoroughly examine the premises. In fact, the greatest expense for most pest control businesses is the labor associated with these regular customer inspections.

If pests are found, then the property owner may elect to enter the treatment phase.

Treatment often consists of or comprises applying pesticide to the premises. However, often application of pesticide is applied regardless of whether any pests are present or not. And it is also known to arbitrarily pre-treat building sites with chemicals before building. In such instances, application of the pesticide is wasteful and may needlessly contribute to environmental pollution.

In order to reduce the labour associated with these regular customer inspections, recent advances in pest detection systems have seen a variety of sensors and systems that attempt to automatically detect the presence of pests.

Patent document US 2015/0049919 A1 discloses a device for diagnosis and control of honeybee varroatosis (Varroa mite infection) comprising one or several cameras, connected to image processor. The software of the device is capable of processing the picture of honeybee, recognition the presence or absence of varroa mite on the body of the bee on the field-of-view of the cameras or in the chamber for observation, counting the infected and non-infected bees, separating the infected bees from non-infected bees or killing the recognized varroa mites. Controlled gates, valves, positioning actuators and/or heaters are used as output devices for realization of the said actions. The method of image processing for recognition of varroa mite or other parasites comprises of searching reflections in the image and analysis of the surroundings of the found reflections. Patent document US 2015/0049919 A1 does not disclose that a relation between infected and non-infected bees are calculated.

Further problems addressed by aspects of the invention will become clear from the following detailed description of the various embodiments.

The present invention, according to an aspect thereof, improves the process to automatically calculate the deviation relation of a population registered on an image. The population could be objects resulting from industrial processes, a group of harvested fruits or vegetables, a group of biological population, such as a beehive, a group of chickens in poultry farming etc.

The present invention, according to an aspect thereof, relates to a method for calculating the deviation relation of a population registered on an image comprising the following method steps;
  i.) identify the objects in the image,
  ii.) count the number of identified objects,
  iii.) identify abnormalities in said image,
  iv.) identify objects with abnormalities in said image,
  v.) count the number of objects with abnormalities,
  vi.) calculate the relation of objects with abnormalities to all objects.

According to further aspects of the improved method for calculating the deviation relation of a population registered on an image, provision is made as follows;
  the objects are organisms.
  the organisms are bees.
  the abnormalities are pests.
  the pests are varroa mites.
  the identification of the objects in the image comprises using a combination of deep and shallow convolutional neural networks.
  the identification of the abnormalities in the image comprises utilizing the changes and/or difference in color, reflectivity, and/or shadows between the abnormality and the object for identifying the abnormality.

The invention further relates, according to an aspect thereof, to a computer program comprising program code, which, when said program code is executed on a computer, causes said computer to perform the method for calculating the deviation relation of a population registered on an image.

The invention further relates, according to an aspect thereof, to a handheld computer device comprising at least one image sensor, at least one microprocessor and at least one application for communicating image information to a server and/or an externally arranged computer device executing the computer program for calculating the deviation relation of a population registered on an image.

The invention further relates, according to an aspect thereof, to a system comprising means for communication arranged to at least one computer, where the computer is arranged with at least one microprocessor and an arrangement for storage of a computer program wherein the computer executes the computer program for calculating the deviation relation of a population registered on an image.

The disclosed method describes how to automatically calculate the deviation relation of a population registered on an image instead of, as common today, to manually, by visual inspection, make a professional guess of the deviation in a population. As an example, a beekeeper inspects the beehive, or more specifically, a number of frames in the beehive to determine how many bees are affected by, for example, the varroa mite. Depending on estimations made by the beekeeper, means are taken to eliminate the varroa mite. If the beekeeper underestimates the infestation of the varroa mite the varroa mite is not eliminated from the beehive. In the other case, if the beekeeper overestimate the infestation of the varroa mite, unnecessary strong means, for example chemicals leaving residues possibly causing resistance to the used chemicals, could be used to treat the bee colony. Unnecessary strong means could also result in unnecessary suffering of the bees, unnecessary cost of the used treatment and unnecessary environmental pollution due to overuse of chemicals. The conventional method to determine varroa infestation, i.e. the use of alcohol wash, have the drawback of being destructive to the tested population and to be unethical.

By making a better estimation of the deviation relation of a population a more efficient, non-destructive, cost reducing and environmental friendly treatment is possible.

BRIEF DESCRIPTION OF FIGURES

Different embodiments of the invention are described in more detail below with reference to the attached figures, in which.

DETAILED DESCRIPTION

The invention relates to a method for detecting abnormalities in a population and calculating a relation of the number of deviating objects compared to the total number of objects. In, for example, biological detection that detects biological activity including, but is not limited to: insect activity, rodent activity, reptilian activity, bird activity, other animal activity, fungal activity, mold growth, spore dissemination, or any other type of detectable biological activity.

Deviation relation include, but are not limited to, infestation and/or relation of defective, affected, infected, abnormal, discolored objects compared to the complete number of objects.

Figure 1:
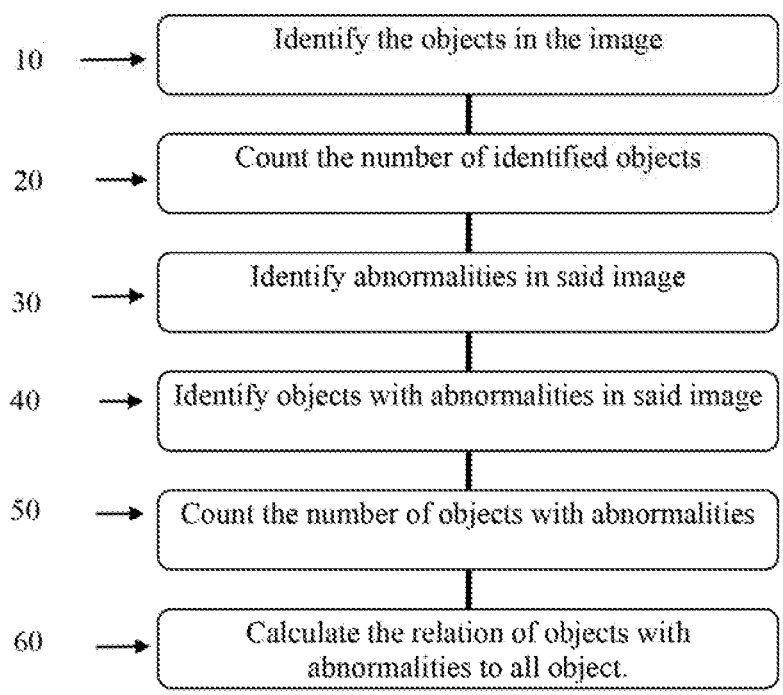
FIG. 1 shows method steps of calculating the deviation relation of a population registered on an image for to an embodiment of the invention.

In FIG. 1 the method steps for calculating the deviation relation of a population registered on an image 1, is disclosed. The first method step, identify the objects in the image 10, includes a method to identify objects in an image. After an image is registered, for example by a digital camera, the information in the image, preferably in a digital format, is provided to be processed by the method. The method is preferably implemented in software, the software is arranged to be processed in a computer including a microprocessor or other central processing unit.

Calculating big population is commonly known as crowd counting and an alternative to crowd counting is a deep learning based approach for estimating the crowd density as well as the crowd count from still images. A crowd is a population of objects, such as persons but not limited to persons. Counting crowds in highly dense scenarios poses a variety of challenges. Highly dense crowd images suffer from severe occlusion, i.e. that objects are hidden behind other objects, making the traditional methods, such as face/person detectors, ineffective. Crowd images can be captured from a variety of angles introducing the problem of perspective. Perspective problems results in non-uniform scaling of the crowd necessitating the estimation model to be scale invariant to large scale changes. Furthermore, unlike other vision problems, annotating highly dense crowd images is a laborious task. This makes the creation of large-scale crowd counting datasets infeasible and limits the amount of training data available for learning-based approaches.

Hand-crafted image features often fail to provide robustness to challenges of occlusion and large-scale variations. Hand-crafted features refer to properties derived using various algorithms using the information present in the image itself. For example, two simple features that can be extracted from images are edges and corners. A basic edge detector algorithm works by finding areas where the image intensity abruptly changes. To understand that we need to remember that a typical image is nothing but a 2D matrix (or multiple matrices or tensor or n-dimensional array, when you have multiple channels like Red, Green, Blue, etc). In the case of an 8-bit gray-scale image the image is typically a 2D matrix with values ranging from 0 to 255, with 0 being completely black and 255 being completely white. An improved approach for crowd counting relies instead on deep learnt features using the framework of fully convolutional neural networks (CNN).

An improved alternative to tackle the issue of scale variation in the crowd images is using a combination of a shallow and deep convolutional architectures. A shallow network, or convolutional architecture, is a network with only one intermediate, i.e. hidden, layer while a deep network has at least two hidden layers. By performing extensive data augmentation by sampling patches from the multi-scale image representation makes the system robust to scale variations. Crowd images are often captured from varying viewpoints, resulting in a wide variety of perspectives and scale variations. Objects, such as insects, near the camera are often captured in a great level of detail i.e., details such as their head contour and at times their entire body is captured. However, in the case of objects, such as insects, away from camera or when images are captured from an aerial viewpoint, each person/object is represented only as a body blob. Efficient detection of object/people in both these scenarios requires the model to simultaneously operate at a highly semantic level (head/body detectors) while also recognizing the low-level body blob patterns. We solve the problems as discussed above using a combination of deep and shallow convolutional neural networks.

A deep network captures the desired high-level semantics required for crowd counting using an architectural design similar to the well-known VGG-16 network (as described in K. Simonyan and A. Zisserman. Very deep convolutional networks for large-scale image recognition. arXiv preprint arXiv:1409.1556, 2014, hereby incorporated in this document by reference.). Originally the VGG-16 architecture was trained for the purpose of object classification, the learned filters are very good generic visual descriptors and have found applications in a wide variety of vision tasks such as saliency prediction, object segmentation etc.

The model efficiently builds up on the representative power of the VGG (Visual Geometry Group) network by fine-tuning its filters for the problem of crowd counting. However, crowd density estimation requires per-pixel predictions unlike the problem of image classification, where a single discrete label is assigned for an entire image. The pixel-level predictions are obtained by removing the fully connected layers present in the VGG architecture, thereby making our network fully convolutional in nature.

In a detailed implementation, described as one embodiment of the implementation of the method, the VGG network has 5 max-pool layers (max-pooling is a sample-based discretization process. The objective is to down-sample an input representation (image, hidden-layer output matrix, etc.), reducing its dimensionality and allowing for assumptions to be made about features contained in the sub-regions binned) each with a stride of 2 and hence the resultant output features have a spatial resolution of only $1=32$ times the input image. In one adaptation of the VGG model, we set the stride of the fourth max-pool layer to 1 and remove the fifth pooling layer altogether. This enables the network to make predictions at 1-8 times the input resolution. The receptive field mismatch caused by the removal of stride in the fourth max-pool layer was handled using the technique of holes (as described in L.-C. Chen, G. Papandreou, I. Kokkinos, K. Murphy, and A. L. Yuille. Semantic image segmentation with deep convolutional nets and fully connected crfs. arXiv preprint arXiv:1412.7062, 2014, hereby incorporated by reference into this document). Convolutional filters with holes can have arbitrarily large receptive fields irrespective of their kernel size. Using holes, the receptive field of convolutional layers are doubled after the fourth max-pool layer, thereby enabling them to operate with their originally trained receptive field. In the suggested model, the low-level head blob patterns is recognized using a shallow convolutional network. Since blob detection does not require the capture of high-level semantics, this network could be designed to be shallow with a depth of only 3 convolutional layers. Each of these layers has 24 filters with a kernel size of 5×5. To make the spatial resolution of this networks prediction equal to that of its deep counterpart, pooling layers after each convolution layer is used. The shallow network is primarily used for the detection of small head/body-blobs. To ensure that there is no loss of count due to max-pooling, we use average pooling layers in the shallow network. The predictions from the deep and shallow networks is concatenate, each having a spatial resolution of 1=8 times the input image, and process it using a 1×1 convolution layer. The output from this layer is upsampled to the size of the input image using bilinear interpolation to obtain the final crowd density prediction. The total count of the objects/people in the image can be obtained by a summation over the predicted density map. The network is trained by backpropagating the l2 loss computed with respect to ground truth. Where l1 and l2 are two loss functions in machine learning which are used to minimize the error, l1 Loss function stands for Least Absolute Deviations, also known as LAD, l2 Loss function stands for Least Square Errors. Also known as LS. In machine learning, the term "ground truth" refers to the accuracy of the training sets classification for supervised learning techniques. This is used in statistical models to prove or disprove research hypotheses. Training a fully convolutional network using the ground truth of body/head annotations, marked as a binary dot corresponding to each person/insect, would be difficult. The exact position of the head annotations is often ambiguous, and varies from annotator to annotator (forehead, centre of the face etc.), making CNN training difficult. The ground truth is generated by simply blurring each head annotation using a Gaussian kernel normalized to sum to one. This kind of blurring causes the sum of the density map to be the same as the total number of objects/people/insects in the crowd. Preparing the ground truth in such a fashion makes the ground truth easier for the CNN to learn, as the CNN no longer needs to get the exact point of head annotation right. It also provides information on which regions contribute to the count, and by how much. This helps in training the CNN to predict both the crowd density as well as the crowd count correctly. As CNNs require a large amount of training data, we perform an extensive augmentation of our training dataset. We primarily perform two types of augmentation. The first type of augmentation helps in tackling the problem of scale variations in crowd images, while the second type improves the CNN's performance in regions where it is highly susceptible to making mistakes i.e., highly dense crowd regions.

In order to make the CNN robust to scale variations, we crop patches from the multi-scale pyramidal representation of each training image. The scales of 0:5 to 1:2 is considered, incremented in steps of 0.1, times the original image resolution for constructing the image pyramid. We crop 225×225 patches with 50% overlap from this pyramidal representation. With this augmentation, the CNN is trained to recognize people/insects irrespective of their scales. We observed that CNNs find highly dense crowds inherently difficult to handle. To overcome this, we augment the training data by sampling high density patches more often.

The second method step, count the number of identified objects 20, includes a method to count the numbers of objects in the image. The counting is a part of the implementation as described above. Algorithms for calculating and/or estimating the number of objects, such as insects/persons, are described in, for example, "CrowdNet: A Deep Convolutional Network for Dense Crowd Counting" by the author Boominathan et.al., incorporated in this document by reference.

The third method step, identify abnormalities in said image 30, abnormalities could be identified by visual discrepancy such as color variations, changes in reflectivity and/or shadows. For color variations, a discoloring in the surface of the object could be identified, such as a dark spot on a fruit or vegetable, where the discoloring is visually different from the color of the object that is comparatively uniform. Changes in reflectivity could be used to identify abnormalities such as different insects or mites that could have a, compared to the objects, different reflectivity of the surface of the insect and/or mite. For example, varroa or lice where the shell could be comparatively hard and reflective compared to the host where the lice and/or varroa infest.

The fourth method step, identify objects with abnormalities in said image 40, where each identified abnormality is grouped with a specific object.

The fifth method step, count the number of objects with abnormalities 50, each object grouped with an abnormality is counted.

The sixth method step, calculate the relation of objects with abnormalities to all object 60, calculate the amount of abnormal objects in relation to all objects. The calculated relation is preferable presented to the user of the algorithm. The user, such as the beekeeper, then decide how to treat the bee society.

Figure 2:
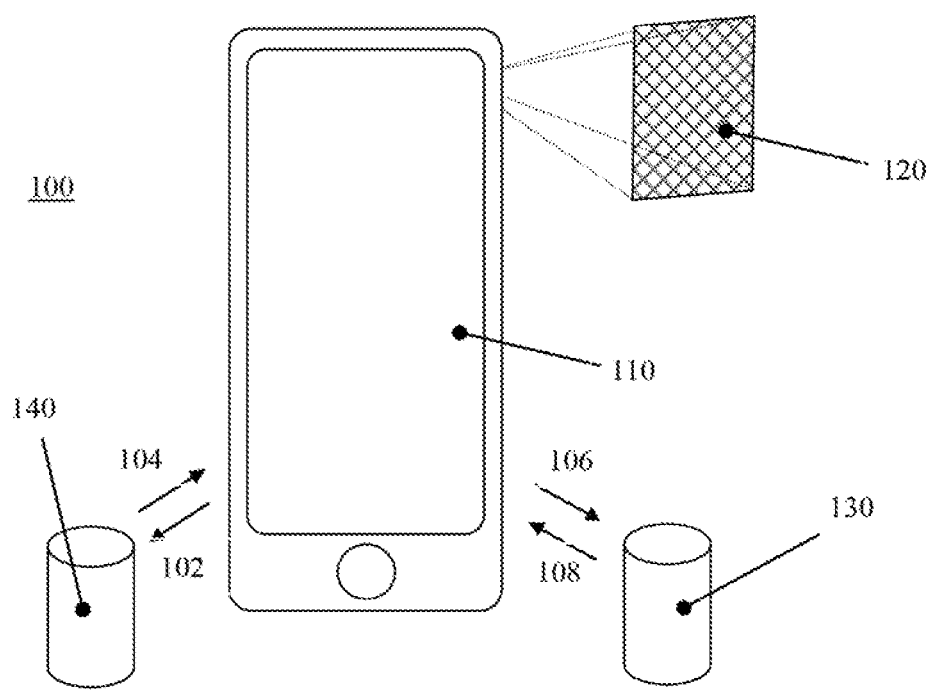
FIG. 2 shows a system realization for calculating the deviation relation of a population registered on an image according to an embodiment of the invention.

FIG. 2 discloses a system realization for calculating the deviation relation of a population registered on an image 100. In the specific implementation, disclosed in FIG. 100, relates to determining the deviations in a bee population, specifically for honeybees. A communication platform, such as a handheld computer device 110, for example a phone or more specifically a smartphone, is used to register an image, i.e. taking a photo, of the specific object, i.e. a frame 120 used in a bee hive. A specific application is arranged in the communication platform preferably by downloading the application from an application service provider 140 such as App Store or other provider of applications for smartphones. The download is initiated by a request 102 and the software application could then be downloaded 104 to the smartphone and installed in the smartphone. When the application is utilized an image is registered, i.e. a photo is taken of the specific frame. The image could be analyzed in the smartphone but the image could also be uploaded to an external server 130 for analysis. The external server 130 could also be a cloud-based service. In the specific case when methods of artificial intelligence and/or automatic learning is utilized it is beneficial to aggregate images from a number of different users to train the algorithms. The image is uploaded 106 to the external server 130 and a result from the analysis is communicated back 108 to the smartphone. The result could be the numbers of identified objects and the number of identified abnormalities and/or the relation of the number of identified objects with abnormalities relative the number of identified objects and/or a specific remedy or treatment scheme depending upon the relation of objects with abnormalities to all objects.

The relation of the number of identified objects with abnormalities relative the number of identified objects could be used to determine the dosage of a treatment in the case of infestation of varroa in a honeybee population.

Figure 3:
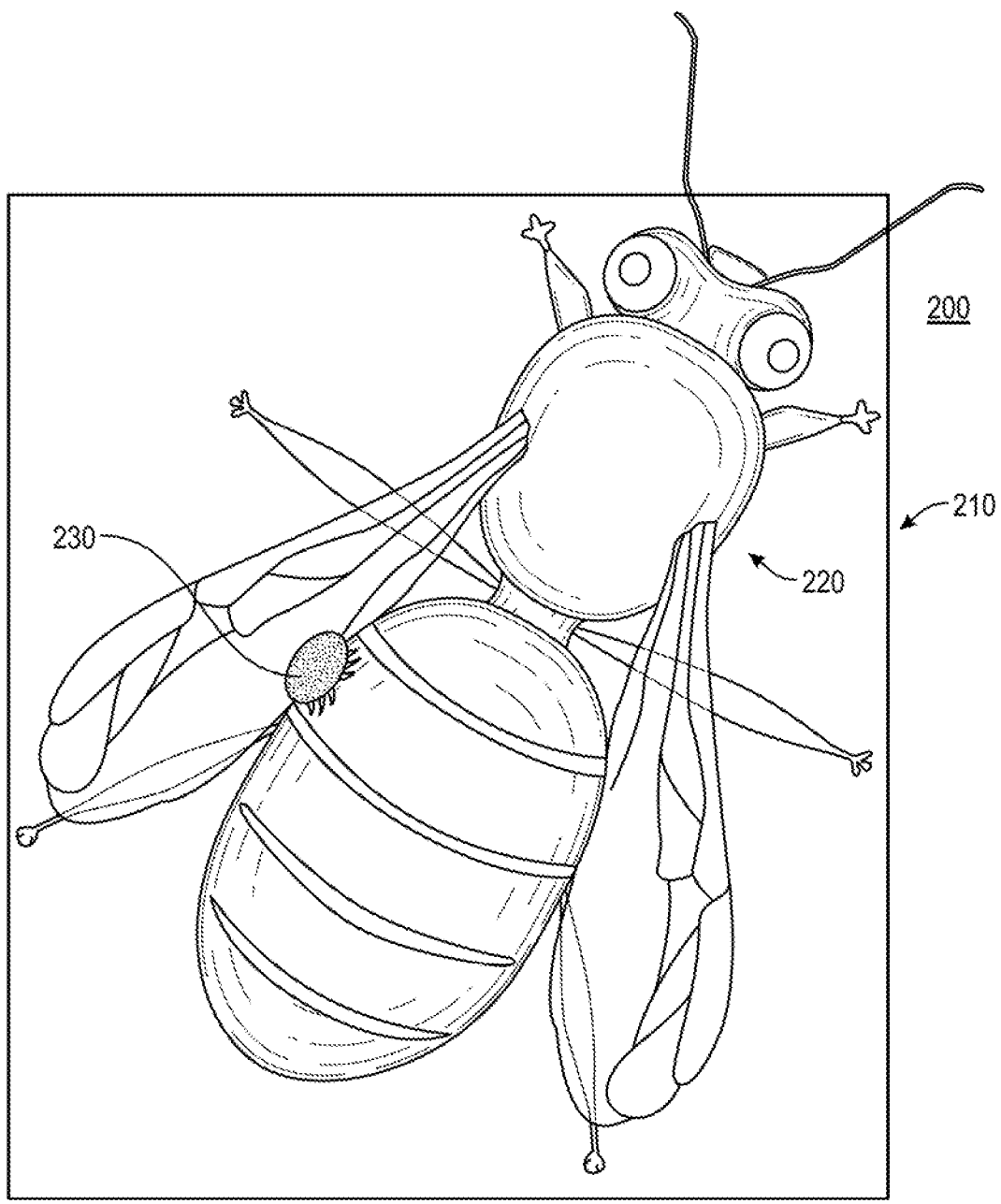
FIG. 3 shows how one type of object is identified in an image according to an embodiment of the invention.

FIG. 3 shows one type of object identified in an image, in this case the identification of a honeybee classed as "bee-with-varroa". The identified object 200 is marked by a bounding box 210 boxing in the identified object that in this case is a bee 220 with a varroa mite 230.

In image classification, the task is to classify an image into a single label. This task is only suitable for images that contain a single object. For images with multiple different objects, a more suitable technique that can be used is object detection, which is the task of both localizing and classifying each object in the image. The localization is represented by a bounding box around each object. A probability distribution of each object category of interest is estimated by the algorithm and the object is said to be classified as the category with the highest probability with a classification certainty of that probability value. It is worth noting that some common datasets for researching object detection algorithms include PASCAL VOC (PASCAL Visual Object Classification) and COCO (Common Objects in Context) that contain 20 and 80 categories, respectively, such as car, bike, motorcycle, bottle, person, etc. The categories in these datasets have a large inter and intra class variance, meaning that each object looks very different than other objects and there is also a large difference between objects within the same category. For the task of detecting small deviations or anomalies and/or abnormalities in an object category (for example detecting bees with and without a varroa), the dataset instead has a small inter and intra class variance. A family of neural networks that have been proposed in the literature for object detection are called Region-based Convolutional Network (R-CNN). They consist of or comprise a Region Proposal Network (RPN) that uses a selective search method for proposing object locations and a Convolution Neural Network (CNN) that classifies each object proposed by the RPN. Many variations of R-CNN exist, including Fast-RCNN (as described in Girshick, Ross. "Fast r-cnn." Proceedings of the IEEE international conference on computer vision. 2015, hereby incorporated in this document by reference.), Faster-RCNN (as described in Ren, Shaoqing, et al. "Faster r-cnn: Towards real-time object detection with region proposal networks." Advances in neural information processing systems. 2015, hereby incorporated in this document by reference.), R-FCN (as described in Dai, Jifeng, et al. "R-fcn: Object detection via region-based fully convolutional networks." Advances in neural information processing systems. 2016, hereby incorporated in this document by reference.), YOLO (as described in Redmon, Joseph, et al. "You only look once: Unified, real-time object detection." Proceedings of the IEEE conference on computer vision and pattern recognition. 2016, hereby incorporated in this document by reference), SSD (as described in Liu, Wei, et al. "Ssd: Single shot multibox detector." European conference on computer vision. Springer, Cham, 2016, hereby incorporated in this document by reference.), Mask R-CNN (as described in He, Kaiming, et al. "Mask r-cnn." Proceedings of the IEEE international conference on computer vision. 2017, hereby incorporated in this document by reference.), and more recently Cascade R-CNN (as described in Cai, Zhaowei, and Nuno Vasconcelos. "Cascade r-cnn: Delving into high quality object detection." Proceedings of the IEEE conference on computer vision and pattern recognition. 2018, hereby incorporated in this document by reference.).

The structure of the CNN for classification can be selected from a variety of proposed architectures, including AlexNet, GoogLeNet, ResNet, InceptionNet, NASNet, etc. Before any training is performed the images fetched from Tagger, i.e. software that adds identifying or classifying tags to pieces of text or data, is passed through a pre-processing pipeline. This pipeline performs a number of important mutations and modifications on the image corpus. These steps are done to get more training data reflecting of the real world images coming in the finished model for inference. Here we mean both actual ahead-of-time batch pre-processing, and on-the-fly part-of-training pre-processing. These are the pre-processing steps currently being used. However, the exact steps being used for a specific model version is constantly adapted.

The disclosed method steps include counting and localizing all objects in an image, counting and localizing all objects with a deviation in an image, and calculating a measurement of how many objects are deviating from the whole population.

Step 1 and 2 of the method for calculating the deviation relation of a population registered on an image includes identifying or localizing and then counting all objects in an image. For counting and localizing all object in an image, there are several approaches that can be used. They can be divided into detection-based methods, region-based methods, density estimation-based methods (as described in Kang, Di, Zheng Ma, and Antoni B. Chan. "Beyond Counting: Comparisons of Density Maps for Crowd Analysis Tasks—Counting, Detection, and Tracking." IEEE Transactions on Circuits and Systems for Video Technology 29.5 (2018): 1408-1422, hereby incorporated in this document by reference.), and CNN-based methods (as described in Sindagi, Vishwanath A., and Vishal M. Patel. "A survey of recent advances in cnn-based single image crowd counting and density estimation." Pattern Recognition Letters 107 (2018): 3-16, hereby incorporated in this document by reference.). The first two methods use a moving window and cropped patches, respectively, which makes them unsuitable for crowded images (when objects are close to each other or only partly visible).

The two last methods usually use a density map which is created by manually annotate each object with a pixel and then each pixel is spread out with a gaussian blur. For CNN-based methods, the network is trained to take the raw image and output the density map. The number of objects is estimated as the sum of all values in the output image. Some examples of CNN-based methods are CrowdNet (as described in Boominathan, Lokesh, Srinivas SS Kruthiventi, and R. Venkatesh Babu. "Crowdnet: A deep convolutional network for dense crowd counting." Proceedings of the 24th ACM international conference on Multimedia. ACM, 2016, hereby incorporated in this document by reference.), Learn to Scale (as described in Xu, Chenfeng, et al. "Learn to Scale: Generating Multipolar Normalized Density Map for Crowd Counting." arXiv preprint arXiv:1907.12428 (2019), hereby incorporated in this document by reference.), and Context-Aware Counting (as described in Liu, Weizhe, Mathieu Salzmann, and Pascal Fua. "Context-Aware Crowd Counting." Proceedings of the IEEE Conference on Computer Vision and Pattern Recognition. 2019, hereby incorporated in this document by reference.)

Step 3 and 4 of the method for calculating the deviation relation of a population registered on an image includes localization or identification and counting all objects with a deviation and/or abnormality in an image. The method step includes that all objects with a certain deviation from other objects of the same class are localized. This can be solved using different approaches. One approach is to set it up as an object detection problem where each deviating object of interest is one category and everything else counts as the background class.

The object detection model, where a number of different models are described above, is trained on manually annotated images with bounding boxes of the objects of interest. Since the model requires annotated images, it is in machine learning referred to supervised leaning. Another approach to localize anomalies in an image is to train a model in an unsupervised learning fashion using an anomaly detection method. These methods can be grouped into cluster-based methods, such as Density-based spatial clustering of applications with noise (DBSCAN) and Gaussian Mixture Model (GMM), or reconstruction-based models, such as Deep Belief Networks (DBN) or Variational Auto-Encoder (VAE).

The fifth step of the method for calculating the deviation relation of a population registered on an image includes calculating a measurement of how many objects are deviating from the whole population Once the previous four method steps have been performed it is a seemingly straightforward process to calculate the percentage of deviating objects of the whole population. However, there is a certain uncertainty from previous method step due to misclassifications, hidden objects, etc. Therefore, the final measurement can be adjusted by a factor to compensate for errors in the first two steps.

Described below is the process of collecting and classifying/labelling image information. The functionality of the method of calculating a deviation of a population is dependent upon training of the algorithm. Training is conducted by providing image information comprising classifications to the neural network arrange to execute the method of calculating a deviation of a population.

There are two main sources for providing new image information into the image classification service, also known as tagger. A user of the method of calculating a deviation of a population provide information, in the form of images, from their apiary and/or beehive into the image classification service, i.e. the Tagger, from the normal use of the application, i.e. the images is transferred to the Tagger as a part of the process of calculating the deviation of a population.

The other alternative is images from other sources, i.e. from individuals interested in providing information, by uploading images to the tagger, to improve the method of calculating a deviation of a population.

In addition to the user supplied image information there is an initial amount of image information from a research project initiated to determine the correlation factor, a factor depicting the ocular occurrence of the varroa mite in relation to the actual amount.

Action 1—Media Collection Mechanism

The neural networks are trained based on classified and/or labeled input of image information also known as supervised learning. The method of supervised training requires less image information in total to get a sufficiently good result compared with methods not requiring classified image information. A drawback with classified and/or labeled image information is the effort of manually inspecting and labeling the image information by trained personnel. Quality in this process, i.e. to provide good source material, is important and reflects in the final capability of trained models.

Action 2—Classification

An object of an image is classified according to a predetermined set of classes. A non-exhaustive list of classes includes, as an example;
"no-class"
"bee"
"bee-with-varroa"
"possibly-bee-with-varroa"
"probably-bee-with-varroa"
"queen"
"queen-with-varroa"
"drone"
"drone-with-varroa"
"varroa-under-wing"
"unphoretic-varroa"
"deformed-wing-virus"
"covered-brood"
"open-brood"
"chalk-brood"
"decapped-brood-cell"
"americanfoulbrood"
"european-foulbrood";
"teacup-cell"
"swarm-cell"
"supersedure-cell"
"emergency-cell"
"punctuated-cell"
"sunken-cell"
"pollen"
"egg"
"missed-object"
"unidentified-object"

An actual implementation of a method for calculating the deviation relation of a population registered on an image do not need to be able to classify all of the different classes as indicated above, in one basic embodiment there is only two classes utilized, i.e. bee and bee-with-varroa.

Action 3—Review—Accept (Note the Region as being Available for Training)

One non mandatory step, to improve quality of and to ensure that sufficiently good classifications has been made and prior to exposing the classified region to training, the Tagger service houses a review by an individual skilled in the art of determining information in the image and validate the classification.

After classification the image information is reviewed, potential errors in the classification could be adjusted by, for example, the following actions;
  reject (note the region as being faulty marked)
  adjust (change the region to its proper class)
  delete (delete region of no interest or delete media file and all regions as a result of poor quality)

Action 4—Export

To support the draw feature of the bounding box (the square depicting the region of interest) in the correct place of the image information, the image information carries coordinate data. To facilitate the export of image information and region metadata the Tagger service also exposes an API used by the neural network training infrastructure. The API is used to pull the regions positional data and class in conjunction with an FTP service, or other file transfer protocol, for the source media.

To always improve on the neural detection models quality and more specifically it's deficiencies the outcome from the current production model is exported back to Tagger (Beescanning production export).

The export is conducted by;
pull region class and positional data via API
pull media file via FTP service Action 5—Improvement Not only the media files are exported but also the regions produced from our production environment. Tagger enables trained personnel to review and correct (note with an issue code) the production models mistakes. The process of noting the production model mistakes results in a set of regions that can be used after the next neural network training for validation of progress.

avoid setting an issue code (essentially marking the success/no action required on the current models result)
note an issue code (highlighting the region as a region of interest for improvement)

The images with classifications are then used to train the neural network infrastructure by supervised training.

The invention is not limited to the particular embodiments shown but can be varied in different ways within the scope of the patent claims.

The method of calculating deviation relation of a population registered on an image could be used for calculating the infestation on a population.

The method of calculating deviation relation of a population registered on an image could also be used for identifying abnormalities in a set of vegetable or fruits. For example, after harvest to identify fruits or vegetables with defects. As an example, to identify abnormal color in fruits.

The method of calculating deviation relation of a population registered on an image could also be used for identifying defects in produced parts in a production facility. As an example, to identify lack of paint or surface treatment or other abnormal visual appearance of the produced part.

The invention claimed is:

1. A method for calculating a deviation relation of a population of a random number of objects registered on an image comprising:
   i.) identifying the objects in the image,
   ii.) estimating a number of identified objects,
   iii.) identifying abnormalities in the image,
   iv.) identifying objects with abnormalities in the image,
   v.) estimating a number of objects with abnormalities, and
   vi.) calculating a relation of objects with abnormalities to all objects in the image;
   wherein the objects are organisms, the organisms are bees, the abnormalities are pests, and the identification of the objects in the image comprises using a combination of deep and shallow convolutional neural networks.

2. The method for calculating the deviation relation of the population registered on the image according to claim 1 wherein the pests are varroa mites.

3. The method for calculating the deviation relation of the population registered on the image according to claim I wherein the identification of the abnormalities in the image comprises utilizing the changes and/or difference in color, reflectivity, and/or shadows between the abnormality and the object for identifying the abnormality.

4. A non-transitory programmable medium comprising a computer program which, when executed on a computer, causes the computer to perform the method according to claim 1.

5. A handheld computer device comprising at least one image sensor, at least one microprocessor and at least one application for communicating image information to a server and/or an externally arranged computer device executing the a computer program that causes the computer device to perform the method according to claim 1.

6. A system comprising means for communication associated with at least one computer, where the computer is arranged with at least one microprocessor and an arrangement for storage of a computer program wherein the computer executes a computer program that causes the computer to perform the method according to claim 1.

* * * * *